(12) United States Patent
Williams et al.

(10) Patent No.: US 11,130,392 B2
(45) Date of Patent: Sep. 28, 2021

(54) DOOR SERVICE HOLE COVER

(71) Applicant: Toyota Motor Engineering & Manufacturing North America, Inc., Plano, TX (US)

(72) Inventors: Paxton S. Williams, Milan, MI (US); Keith O'Brien, Highland, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 151 days.

(21) Appl. No.: 16/417,438

(22) Filed: May 20, 2019

(65) Prior Publication Data

US 2020/0369130 A1 Nov. 26, 2020

(51) Int. Cl.
*B60J 5/04* (2006.01)
*B60R 21/04* (2006.01)

(52) U.S. Cl.
CPC ......... *B60J 5/0451* (2013.01); *B60R 21/0428* (2013.01); *B60R 2021/0414* (2013.01)

(58) Field of Classification Search
CPC . B60J 5/042; B60J 5/0423; B60J 5/044; B60J 5/045; B60J 5/0451; B60R 21/04; B60R 21/0428
USPC ...................................................... 296/146.6
See application file for complete search history.

(56) References Cited

U.S. PATENT DOCUMENTS

| | | | |
|---|---|---|---|
| 6,203,096 B1 | 3/2001 | Noda et al. | |
| 6,547,280 B1 * | 4/2003 | Ashmead | F16F 7/121 180/90 |
| 6,550,850 B2 * | 4/2003 | Laborie | B60R 21/04 188/371 |
| 7,712,992 B2 | 5/2010 | Hirose et al. | |
| 7,913,807 B2 | 3/2011 | Gomi | |
| 8,056,962 B2 * | 11/2011 | Tauchi | B60R 21/04 296/187.05 |
| 8,140,218 B2 | 3/2012 | Kawaura et al. | |
| 8,910,737 B2 | 12/2014 | Saeki | |
| 9,004,529 B2 | 4/2015 | Torii | |
| 9,259,995 B2 * | 2/2016 | Steinbrecher | B60J 5/0451 |

(Continued)

FOREIGN PATENT DOCUMENTS

DE 102008033623 A1 * 1/2010 ............ B60J 5/0451
JP H11179797 7/1999

(Continued)

OTHER PUBLICATIONS

English Translation of JP 2016-203890; retrieved via Patent-Translate located at www.epo.org. (Year: 2021).*

*Primary Examiner* — Jason S Daniels
(74) *Attorney, Agent, or Firm* — Snell & Wilmer LLP

(57) ABSTRACT

Systems and apparatus for a vehicle for improving occupant safety and covering a service hole of a door of the vehicle. The system includes a substantially flat body portion configured to cover the service hole. The system also includes a plurality of energy absorbers disposed across the body portion, each energy absorber having a top portion and one or more side walls surrounding the top portion and defining a cavity, each energy absorber having a closed end at the top portion and an open end opposite the closed end, each energy absorber configured to absorb energy and collapse when force is exerted by an object on the top portion, the object moving from the closed end toward the open end.

20 Claims, 6 Drawing Sheets

(56) References Cited

U.S. PATENT DOCUMENTS

| | | | |
|---|---|---|---|
| 9,302,569 B2 | 4/2016 | Ogino et al. | |
| 9,676,424 B2 | 6/2017 | Ito et al. | |
| 2002/0017805 A1* | 2/2002 | Carroll, III | F16F 7/121 |
| | | | 296/187.03 |
| 2004/0178662 A1* | 9/2004 | Carroll, III | F16F 7/121 |
| | | | 296/187.03 |
| 2004/0264729 A1 | 12/2004 | Ito et al. | |
| 2007/0187961 A1* | 8/2007 | Audi | B32B 3/28 |
| | | | 293/134 |
| 2017/0080784 A1 | 3/2017 | Kobayashi et al. | |
| 2018/0244232 A1 | 8/2018 | Suzuki | |
| 2018/0257597 A1 | 9/2018 | Migaki et al. | |

FOREIGN PATENT DOCUMENTS

| | | |
|---|---|---|
| JP | 2016078775 | 5/2016 |
| JP | 2016203890 | 12/2016 |

\* cited by examiner

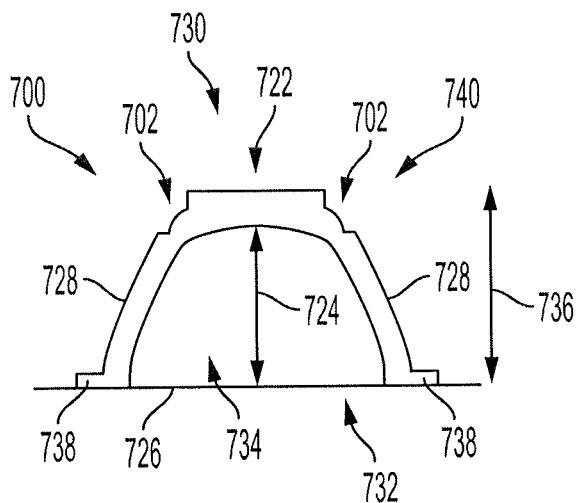
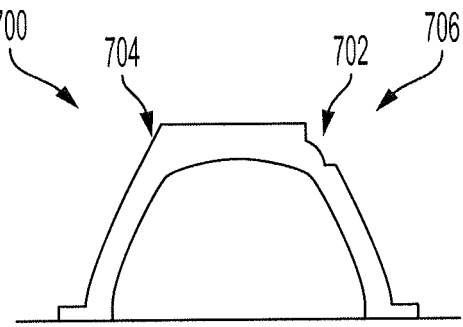
FIG. 7A
FIG. 7B
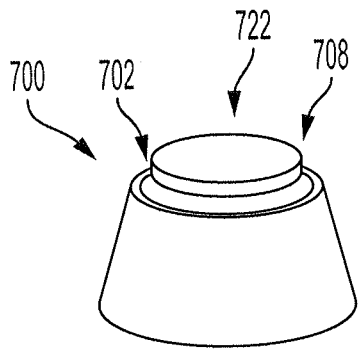
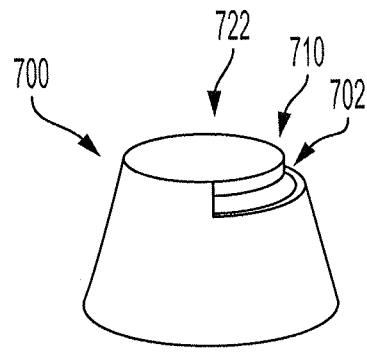
FIG. 7C
FIG. 7D
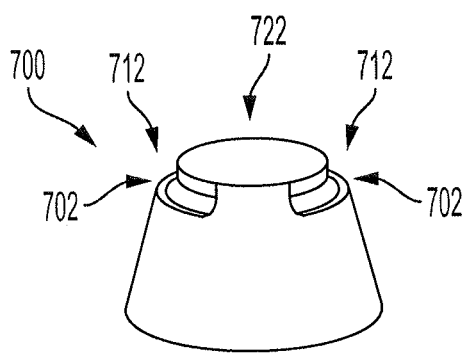
FIG. 7E

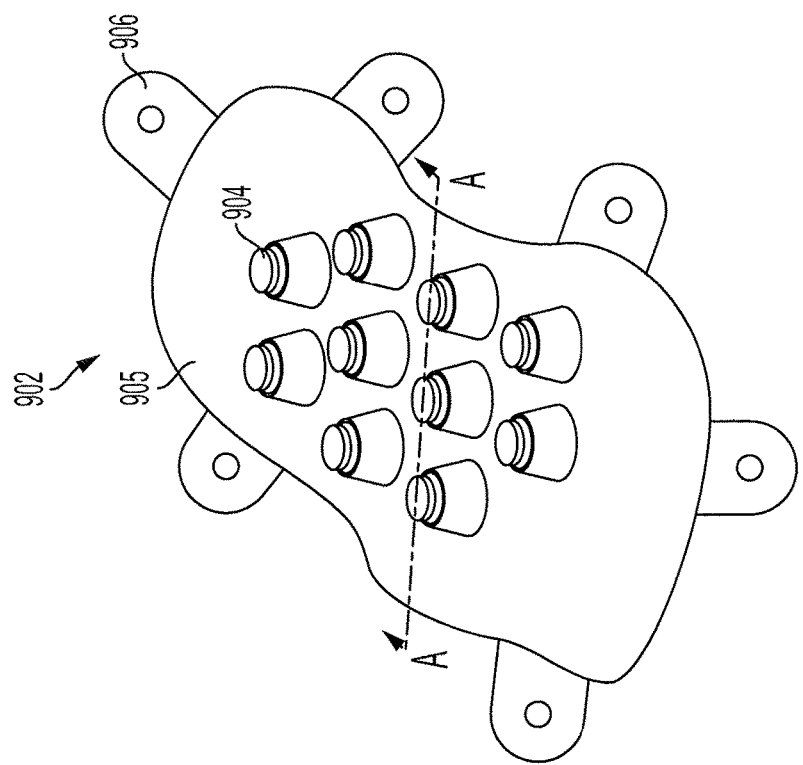
FIG. 9
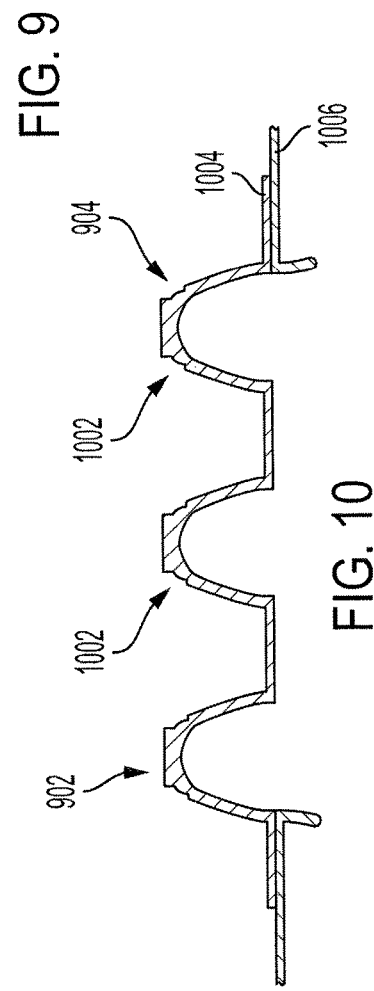
FIG. 10
FIG. 8

DOOR SERVICE HOLE COVER

BACKGROUND

1. Field

This specification relates to a system and a method for improving the safety of doors of a vehicle.

2. Description of the Related Art

Vehicles may include doors, which open to allow passengers and cargo to enter and exit a vehicle. The doors may include a service hole to allow access to the interior chamber of the door. The interior chamber may be accessed to install components of the door or to repair components of the door. The service hole may be covered by a service hole cover. In a situation where a side impact is experienced by the vehicle at the door, the service hole and the service hole cover may be areas of vulnerability for passenger safety. Thus, there is a need for improved safety systems at and around the service hole cover of a vehicle door.

SUMMARY

What is described is a door service hole cover for covering a service hole of a door of a vehicle. The door service hole cover includes a substantially flat body portion. The door service hole cover also includes a plurality of energy absorbers disposed across the body portion, each energy absorber having a top portion and one or more side walls surrounding the top portion and defining a cavity, each energy absorber having a closed end at the top portion and an open end opposite the closed end, each energy absorber configured to absorb energy and collapse when force is exerted by an object on the top portion, the object moving from the closed end toward the open end.

Also described is a vehicle door including an interior door structure located within a door and having a service hole. The vehicle door also includes a service hole cover attached to the interior door structure. The service hole cover includes a substantially flat body portion. The service hole cover also includes a plurality of energy absorbers disposed across the body portion, each energy absorber having a top portion and one or more side walls surrounding the top portion and defining a cavity, each energy absorber having a closed end at the top portion and an open end opposite the closed end, each energy absorber configured to absorb energy and collapse when force is exerted by an object on the top portion, the object moving from the closed end toward the open end.

Also described is a system for covering a service hole of a door of a vehicle. The system includes a substantially flat body portion configured to cover the service hole. The system also includes a plurality of energy absorbers disposed across the body portion, each energy absorber having a top portion and one or more side walls surrounding the top portion and defining a cavity, each energy absorber having a closed end at the top portion and an open end opposite the closed end, each energy absorber configured to absorb energy and collapse when force is exerted by an object on the top portion, the object moving from the closed end toward the open end.

BRIEF DESCRIPTION OF THE DRAWINGS

Other systems, methods, apparatus, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 7A-7B illustrate side cross-sectional views of the energy absorber, according to various embodiments of the invention.

FIGS. 7C-7E illustrate top perspective views of the energy absorber, according to various embodiments of the invention.

FIG. 8 illustrates a door with a service hole, according to various embodiments of the invention.

FIG. 9 illustrates a service hole cover, according to various embodiments of the invention.

FIG. 10 illustrates a side cross-sectional view of the service hole cover of FIG. 9, according to various embodiments of the invention.

DETAILED DESCRIPTION

Disclosed herein are systems and apparatus for covering a service hole of a door and providing energy absorption from an object striking the door, such as another vehicle. Conventional doors may use a foam energy absorber attached to a service hole cover. However, these conventional foam energy absorbers become fully compressed at a 60%-80% compression, and when they are fully compressed, they are not capable of further energy absorption. In addition, in order to maximize room in the passenger cabin for occupants, the available space in the door for energy absorbing components may be small. Thus, an efficient and compact energy absorber at the service hole cover of a door is desired.

The systems and apparatuses described herein provide a novel service hole cover and novel energy absorbing structures on the service hole cover to provide energy absorption. As will be shown herein, the systems and apparatuses described herein provide an efficient and compact solution to the energy absorbing needs of a vehicle door at the service hole location. The systems and apparatuses described herein improve the safety of the vehicle to the occupants within the vehicle by more efficiently absorbing energy from objects which make contact with the vehicle door.

Figure 1B:
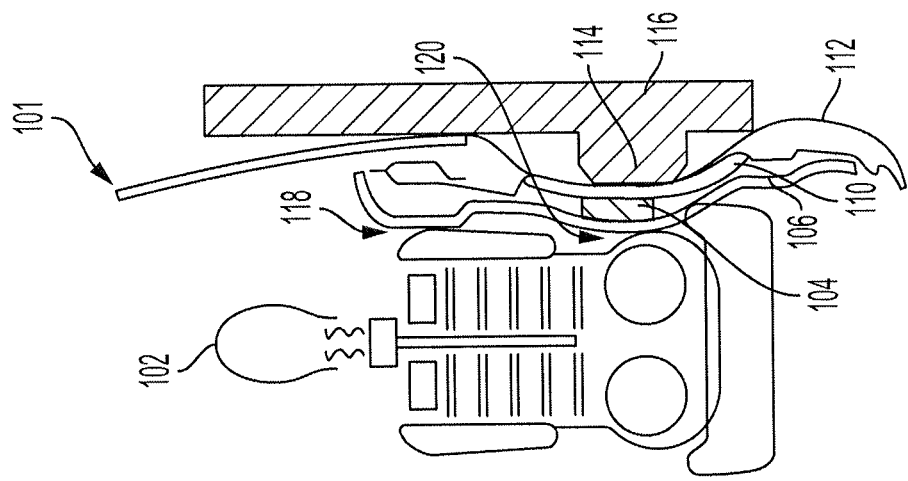
FIGS. 1A-1B illustrate a door being contacted by an object, according to various embodiments of the invention.
Figure 1A:
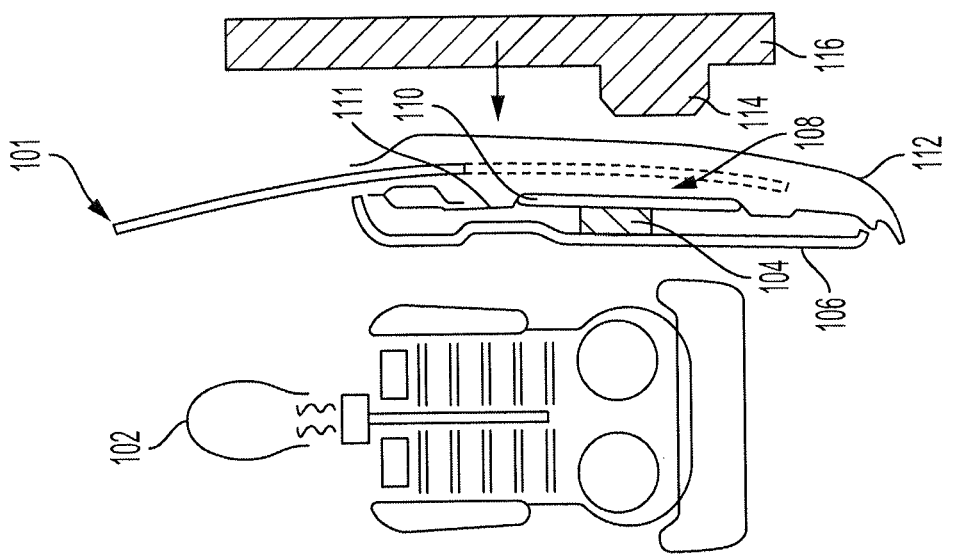

FIG. 1A illustrates an occupant of a vehicle as a side-impact object approaches the door of the vehicle. The occupant 102 is illustrated as a testing dummy, but may be a human being. The door 101 of the vehicle has an exterior door shell 112 that is exposed to the outside of the vehicle and an interior door trim 106, which is inside the vehicle. Between the interior door trim 106 and the exterior door shell 112 are (from outward to inward order) an empty area 108, a service hole cover 110, and an energy absorber 104. The service hole cover 110 is connected to an internal door structure 111 that the service hole is formed in. In some embodiments, there may be additional components between the interior door trim 106 and the exterior door shell 112. Conventional energy absorbers 104 are made of foam. The exterior door shell 112 may be made of a rigid metal, such as steel or aluminum.

Approaching the door 101 is an object 116, which may have a protrusion 114. In many instances, the object 116 is another vehicle, such as a sports utility vehicle, and the protrusion 114 is the bumper of the other vehicle.

As illustrated in FIG. 1B, when the object 116 and the protrusion 114 make contact with the door 101, the various components of the door 101 are compressed and "stacked up" on top of one another. That is, the exterior door shell 112 absorbs some of the force from the object 116 and compresses onto the next adjacent door component, which is the service hole cover 110. The service hole cover 110 absorbs some of the force from the object 116 and compresses onto the next adjacent door component, which is the energy absorber 104. The energy absorber 104 absorbs some of the force from the object 116 and compresses onto the next adjacent door component, which is the interior door trim 106.

Once all of the door components are fully compressed and unable to absorb more force, the occupant 102 experiences the force from the object 116. The door components may be designed so that the force experienced by the occupant 102 at the hip area 120 of the occupant 102 is similar to the force experienced by the occupant 102 at the shoulder area 118 of the occupant 102 such that the occupant 102 is moved in a relatively even horizontal manner.

When the energy absorber 104 is made of foam, the energy absorber 104 is able to compress and absorb energy, but only to a certain limit. Accordingly, there is a need for improved energy absorbers 104 to be used in the door 101.

Figure 2A:
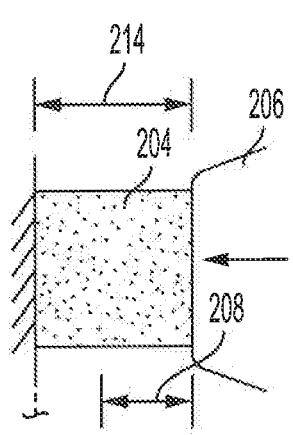
FIGS. 2A-2B illustrate compression of a foam energy absorber, according to various embodiments of the invention.

FIG. 2A illustrates a side cross-sectional view of a conventional foam energy absorber 204 having a thickness 214 being compressed by an object 206. As force is exerted onto the conventional foam energy absorber 204 via the object 206, the conventional foam energy absorber 204 will absorb the force and compress.

Figure 2B:
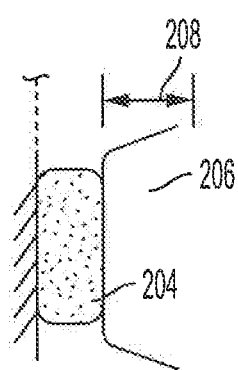

FIG. 2B illustrates the conventional foam energy absorber 204 in a fully compressed state. The conventional foam energy absorber 204 can be compressed by a compression distance 208, which is approximately 60% to 80% of the thickness 214 of the foam energy absorber 204. Once the conventional foam energy absorber 204 is fully compressed, the conventional foam energy absorber 204 acts as a solid and is incapable of further energy absorption.

Figure 3A:
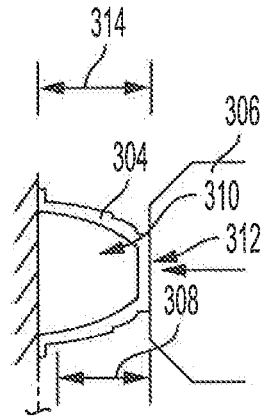
FIGS. 3A-3B illustrate compression of a hollow energy absorber, according to various embodiments of the invention.

FIG. 3A illustrates a side cross-sectional view of an energy absorber 304 of the system described herein. The energy absorber 304 is in a normal state. The energy absorber 304 has a cavity 310 and contacts the object 306 at a top surface 312. The energy absorber 304 also has a height 314. The height 314 of the energy absorber 304 may be substantially similar to the thickness 214 of the conventional foam energy absorber 204. As such, the energy absorber 304 may occupy a similar volume of space as the conventional foam energy absorber 204. As force is exerted onto the energy absorber 304 via the object 306, the energy absorber 304 will absorb the force and compress and deform.

Figure 3B:
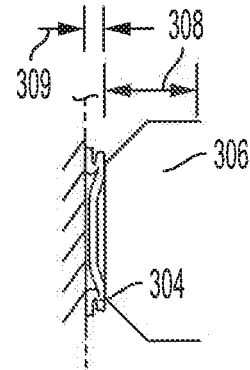

FIG. 3B illustrates the energy absorber 304 after being fully compressed and deformed and in a flattened state. The energy absorber 304 is compressed by a compression distance 308, which is approximately 95% of the height 314 of the energy absorber 304. That is, the energy absorber 304 in the flattened state has a height 309 that is approximately 5% of the height 314 in the normal state. The energy absorber 304 is able to absorb more energy from the object 306 as compared to the conventional foam energy absorber 204 because the energy absorber 304 is able to absorb energy for a longer distance and a longer period of time. In some embodiments, the height 309 in the flattened state is substantially equal to the thickness of the material used to make the energy absorber 304.

Figure 4:
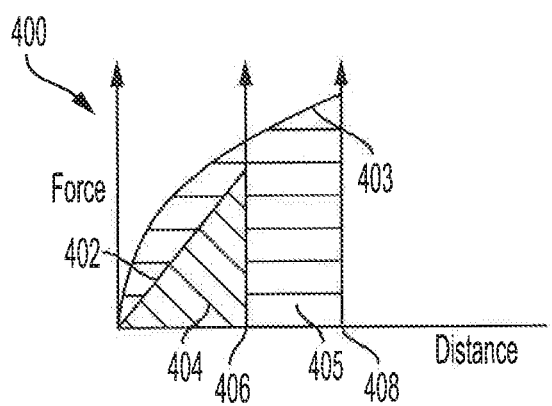
FIG. 4 illustrates a comparison of energy absorbed by the foam energy absorber and the hollow energy absorber, according to various embodiments of the invention.

FIG. 4 illustrates a graph of force as a function of distance experienced by the conventional foam energy absorber 204 of FIGS. 2A-2B and the energy absorber 304 of FIGS. 3A-3B.

The graph 400 shows a first curve 402 representing the force experienced by the conventional foam energy absorber 204 over the distance traveled by the object 206. The first curve 402 has a constant slope, as the compression of the conventional foam energy absorber 204 is relatively consistent. The area 404 under the first curve 402 represents the energy absorbed by the conventional foam energy absorber 204. As shown in FIGS. 2A-2B, the conventional foam energy absorber 204 is capable of absorbing energy up to a distance 406. Once the object 206 has reached the distance 406, the conventional foam energy absorber 204 is unable to absorb any more energy, and the curve 402 falls to zero.

The graph 400 also shows a second curve 403 representing the force experienced by the energy absorber 304 over the distance traveled by the object 306. The second curve 403 has a less constant slope than the first curve 402. The second curve 403 lasts until a second distance 408. The second distance 408 corresponds to the compression distance 308 of the energy absorber 304. The distance 406 corresponds to the compression distance 208 of the conventional foam energy absorber 204. The area 405 under the second curve 403 represents the energy absorbed by the energy absorber 304. The area 405 is greater than the area 404, demonstrating that the energy absorber 304 is capable of absorbing more energy than the conventional foam energy absorber 204. As shown in FIG. 4, the energy absorber 304 is a superior energy absorbing device compared to the conventional foam energy absorber 204, while occupying approximately the same amount of space as the conventional foam energy absorber 204.

Figure 5:
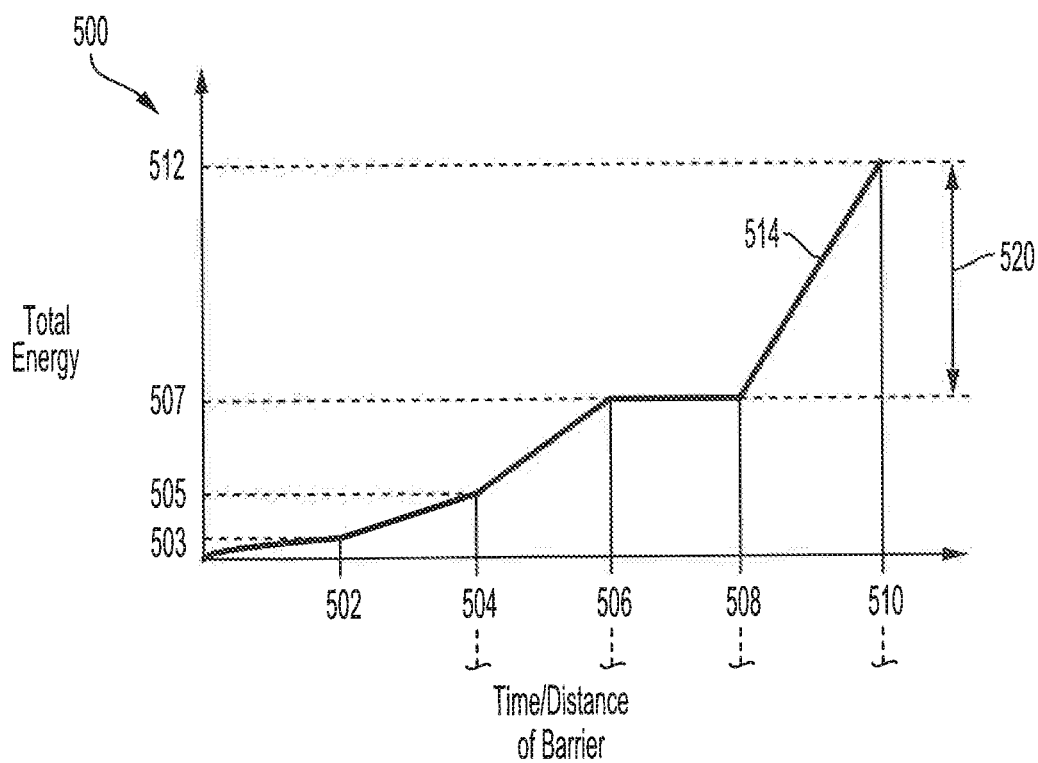
FIG. 5 illustrates energy absorbed by a door and an occupant using a foam energy absorber, according to various embodiments of the invention.

FIG. 5 illustrates a graph of total energy as a function of distance experienced by a door (e.g., door 101) and the occupant (e.g., occupant 102) using a conventional foam energy absorber 204 of FIGS. 2A-2B and an occupant when the door is struck by an object (e.g., object 116).

The graph 500 includes a first curve 514 representing the total energy absorbed by the door and the occupant. The horizontal axis represents distance of the object as it strikes the door and imparts force onto the door. While the horizontal axis is described herein as representing distance, the horizontal axis may also represent time, as the object moves toward the door over time.

The first curve 514 rises between zero and the first distance 502. This portion represents the energy absorbed by the door as the exterior door shell (e.g., exterior door shell 112) is impacted. As the object moves further toward the door, the energy absorbed increases. At the first distance 502, the door has absorbed a first amount of energy 503.

The first curve 514 also rises between the first distance 502 and the second distance 504. This portion represents the energy absorbed by the door as the exterior door shell (e.g., exterior door shell 112) is deformed into any empty area (e.g., empty area 108) between the exterior door shell and the service hole cover (e.g., service hole cover 110). At the second distance 504, the exterior door shell is flattened onto the service hole cover. At the second distance 504, the door has absorbed a second amount of energy 505.

The first curve 514 also rises between the second distance 504 and the third distance 506. This portion represents the energy absorbed by the door as service hole cover and the conventional foam energy absorber (e.g., conventional foam energy absorber 204) are deformed and the conventional foam energy absorber absorbs energy. At the third distance 506, the exterior door shell is flattened onto the service hole cover and the conventional foam energy absorber, and the conventional foam energy absorber is fully flattened (as illustrated in FIG. 2B). At the third distance 506, the door has absorbed a third amount of energy 507.

The first curve 514 remains flat from the third distance 506 to the fourth distance 508. During this period, the object moves toward the occupant of the vehicle, but the door is no longer absorbing any energy, as the conventional foam energy absorber has been fully compressed and is unable to absorb any further energy. The exterior door shell, the service hole cover, the conventional foam energy absorber, and the interior door trim (e.g., interior door trim 106) are all fully flattened. At the fourth distance 508, the door has absorbed the maximum amount of energy it is capable of absorbing, which is the third amount of energy 507.

The first curve 514 begins to rise again from the fourth distance 508 to the fifth distance 510. This portion represents the energy experienced by the occupant as the fully flattened door has made contact with the occupant. At the fifth distance 510, a total amount of energy 512 has been transferred from the object to the door and the occupant. The amount of energy experienced by the occupant 520 is the difference between the total amount of energy 512 and the third amount of energy 507, which represents the energy absorbed by the door.

Figure 6:
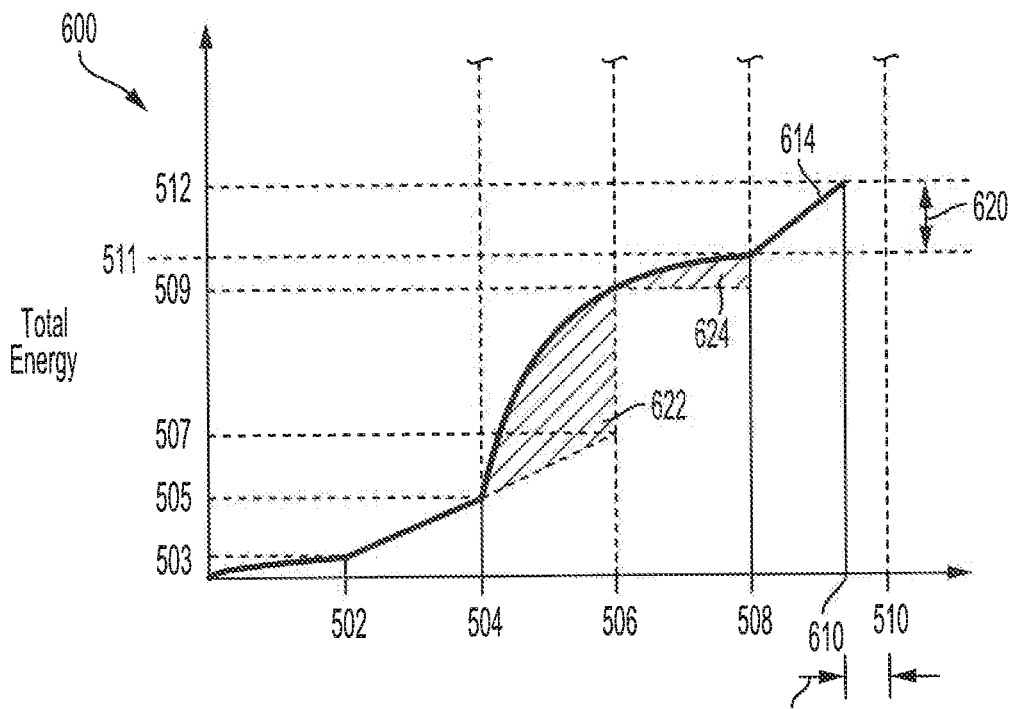
FIG. 6 illustrates energy absorbed by a door and an occupant using a hollow energy absorber, according to various embodiments of the invention.

FIG. 6 illustrates a graph of total energy as a function of distance experienced by a door and the occupant using a hollow energy absorber (e.g., energy absorber 304 of FIGS. 3A-3B) when the door is struck by an object.

The graph 600 includes a second curve 614 representing the total energy absorbed by the door and the occupant. The horizontal axis represents distance of the object as it strikes the door and imparts force onto the door. While the horizontal axis is described herein as representing distance, the horizontal axis may also represent time, as the object moves toward the door over time.

Similar to the first curve 514 of FIG. 5, the second curve 614 rises between zero and the first distance 502. This portion represents the energy absorbed by the door as the exterior door shell (e.g., exterior door shell 112) is impacted. As the object moves further toward the door, the energy absorbed increases. At the first distance 502, the door has absorbed a first amount of energy 503.

Also similar to the first curve 514 of FIG. 5, the second curve 614 also rises between the first distance 502 and the second distance 504. This portion represents the energy absorbed by the door as the exterior door shell (e.g., exterior door shell 112) is deformed into any empty area (e.g., empty area 108) between the exterior door shell and the service hole cover (e.g., service hole cover 110). At the second distance 504, the exterior door shell is flattened onto the service hole cover. At the second distance 504, the door has absorbed a second amount of energy 505.

Unlike the first curve 514 of FIG. 5, the second curve 614 steeply rises between the second distance 504 and the third distance 506. This portion represents the energy absorbed by the door as the service hole cover and the hollow energy absorber (e.g., energy absorber 304) are deformed and the hollow energy absorber absorbs energy. At the third distance 506, the conventional foam energy absorber would have absorbed a third amount of energy 507, but the hollow energy absorber has absorbed a fourth amount of energy 509 greater than the third amount of energy 507.

At the third distance 506, the conventional foam energy absorber would have been fully flattened and unable to absorb any further energy, as shown in FIG. 5. However, the hollow energy absorber is able to continue absorbing energy past the third distance 506.

The second curve 614 continues to rise between the third distance 506 and the fourth distance 508. This portion represents the energy absorbed by the door as the exterior door shell is flattened onto the service hole cover and the hollow energy absorber, and the hollow energy absorber is fully flattened (as illustrated in FIG. 3B). At the fourth distance 508, the door has absorbed a fifth amount of energy 511. By contrast, the flat dashed line between the third distance 506 and the fourth distance 508 shows that a fully compressed energy absorber would not have absorbed more energy between the third distance 506 and the fourth distance 508. The fifth amount of energy 511 is the total amount of energy capable of being absorbed by the door using the hollow energy absorber.

The second curve 614 begins to rise again from the fourth distance 508 to the fifth distance 610. This portion represents the energy experienced by the occupant as the fully flattened door contacts the occupant. At the fifth distance 610, a total amount of energy 512 has been transferred from the object to the door and the occupant. The amount of energy experienced by the occupant 620 is the difference between the total amount of energy 512 and the fifth amount of energy 511, which represents the energy absorbed by the door.

The total amount of energy 512 absorbed in FIG. 6 is the same as the total amount of energy 512 absorbed in FIG. 5, as the same object has impacted the door in the same manner. However, the amount of energy experienced by the occupant 520 when using the conventional foam energy absorber is much greater than the amount of energy experienced by the occupant 620 when using the hollow energy absorber. In addition, the distance traveled by the object is shorter by a distance difference 618, illustrating the effectiveness of the hollow energy absorber in absorbing energy, as compared to the conventional foam energy absorber.

FIG. 7A illustrates a side cross-sectional view of an energy absorber 700 similar to energy absorber 304.

The energy absorber 700 includes a top portion 722 and one or more side walls 728 that connect to the top portion 722. The one or more side walls 728 may be individual wall segments such that the shape from a top view is a multi-sided shape, or the one or more side walls 728 may be a single continuous wall such that the shape from the top view is a circle or oval or ellipse. The one or more side walls 728 surround the top portion 722 and form a closed end 730. The one or more side walls 728 also define a cavity 734 and form an open end 732 opposite the closed end 730.

The cavity 734 has a height 724. The energy absorber 700 may have an overall height 736 that is taller than the height 724 of the cavity 734. The energy absorber 700 may be located on top of a surface 726. The surface 726 may cover the open end 732 or may contact only a bottom portion 738 of the one or more side walls 728 such that the open end 732 remains open.

The one or more side walls 728 join the top portion 722 at a shoulder portion 740. The shoulder portion 740 may include a groove 702 where the material that the energy absorber 700 is made of is thinned. Alternatively, the groove 702 may be referred to as a cutout, channel or trigger. The groove 702 helps the energy absorber 700 collapse in a controlled and predictable manner after a threshold amount of force is exerted onto the top portion 722. The groove 702 also helps the energy absorber 700 to have a height (e.g., height 309) in a collapsed state that is substantially equal to the thickness of the material used to make the energy absorber 700.

FIG. 7B illustrates an energy absorber 700 with a partial groove 702, which does not extend along the entire perimeter of the top portion. That is, there is a groove 702 on a first side 706 of the energy absorber 700, but not on a second side 704 of the energy absorber 700. The energy absorber 700 may have un-uniform grooves in order to provide a directed crumpling of the energy absorber 700. Depending on the design of the door and the components underneath the energy absorber, the energy from the object may be focused in a particular direction.

For example, if the energy absorber 700 of FIG. 7B were to be contacted by an object at the top portion 722, due to the lack of a groove 702 at the second side 704, the force of the object may be directed toward the first side 706, as the groove 702 on the first side 706 may promote a collapsing of the side walls 728 on the first side 706 sooner than a collapsing of the side walls 728 on the second side 704.

The top portion 722 may have a flat top surface, as shown in FIGS. 7A and 7B, or the top portion 722 may have an inclined top surface or ridged top surface, or any other topography. The combination of top surface shape and groove location and depth may be tuned to the needs of the particular door.

FIG. 7C illustrates a top perspective view of an energy absorber 700 with a groove 702 that is located around an entire perimeter 708 of the top portion 722.

FIG. 7D illustrates a top perspective view of an energy absorber 700 with a groove 702 that is located around half 710 of the perimeter of the top portion 722.

FIG. 7E illustrates a top perspective view of an energy absorber 700 with grooves 702 that are located in periodic locations 712 along the perimeter of the top portion 722.

The energy absorber 700 may be made of a rigid material that is capable of being molded or cast, such as plastic. The material that the energy absorber 700 is made of may be capable of absorbing sounds, to prevent sound from outside the door from entering the inside of the vehicle. The material that the energy absorber 700 is made of may be capable of being thinned at locations, such as groove 702. The material that the energy absorber 700 is made of may be capable of deforming at a known rate and in a known shape. The deformation and collapsing of the energy absorber 700 may be consistent and reliable based on the material that the energy absorber 700 is made of.

FIG. 8 illustrates a door 802 and a service hole 804. Around the perimeter of the service hole 804 may be tab receivers 806 where corresponding tabs of a service hole cover may be received and fastened to. As described herein, the service hole 804 may enable an individual or a robot to gain access to the inner compartments of the door 802. Once inside the inner compartments of the door 802, parts (e.g., a motor for the window) may be installed or repaired. While the shape of the service hole 804 illustrated in FIG. 8 is that of a "figure 8" or "dual circle" shape, the shape of the service hole 804 may vary based on many factors, including the design of the door 802, the components located within the door 802, and materials the door 802 is made of.

FIG. 9 illustrates a service hole cover 902. The service hole cover 902 is configured to cover a service hole (e.g., service hole 804) of a door. The service hole cover 902 may have tabs 906 that protrude from the perimeter of the service hole cover 902 and are configured to facilitate attachment of the service hole cover 902 to the door. The tabs 906 may be received by corresponding tab receivers (e.g., tab receivers 806) and the tabs 906 may be connected to the tab receivers 806 via a fastener, such as a bolt, a rivet, or a screw, for example.

In some embodiments, the service hole cover 902 does not include any tabs and there are not any tab receivers surrounding the service hole, and instead the service hole cover 902 may have a flange that surrounds the perimeter of the service hole cover 902, and the flange is attached to the rim of the service hole. In these embodiments, the flange of the service hole cover may be removably connected to the rim of the service hole via an adhesive or other material, or may be fixedly connected via welding or brazing.

The service hole cover 902 includes a plurality of energy absorbers 904 (e.g., energy absorber 304, 700). As described herein, the energy absorbers 904 may have any configuration of grooves based on the individual specifications of the vehicle and the door of the vehicle. The service hole cover 902, including the energy absorbers 904, may be made of a rigid material, such as plastic. The material that the service hole cover 902 is made of may be capable of absorbing sounds, to prevent sound from outside the door from entering the inside of the vehicle. The material that the service hole cover 902 is made of may be capable of being thinned at locations, such as the grooves of the energy absorbers 904. The material that the service hole cover 902 is made of may be capable of deforming at a known rate and in a known shape. The deformation and collapsing of the energy absorbers 904 may be consistent and reliable based on the material that the service hole cover 902 is made of. When the service hole cover 902 is made of plastic, the service hole cover 902 may be made by injection molding, additive manufacturing, or any other process for making plastic parts. In some embodiments, the service hole cover 902 is made of a glass resin.

In some embodiments, the service hole cover 902 may be made of a more rigid material, such as aluminum or steel. However, a service hole cover 902 made of plastic (as compared to metal) may be less susceptible to corrosion, have a lower mass, a lower cost, have improved sound blocking, and the process for thinning the energy absorbers to form the grooves may be easier, cheaper, and faster. When compared to conventional foam, the cost to mass ratio of plastic remains relatively low, as plastic is cheap and light weight.

Figure 11:
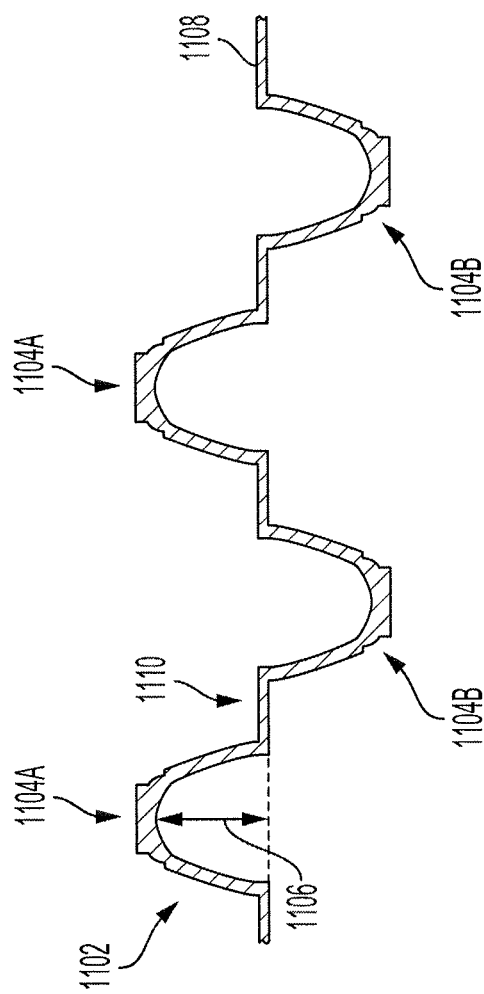
FIG. 11 illustrates a side cross-sectional view of an alternate service hole cover, according to various embodiments of the invention.

The service hole cover 902 includes a body portion 905 that may be formed integrally with the energy absorbers 904. That is, the body portion 905 and the energy absorbers 904 are not overlapping and form a single layer, as shown in FIGS. 10 and 11. In some embodiments, the energy absorbers 904 are manufactured separately and attached to the body portion 905.

The body portion 905 may be made of the same material that the energy absorbers 904 are made of. In some embodiments, the body portion 905 is made of different materials compared to the energy absorbers 904. For example, the energy absorbers 904 and the body portion 905 may be made of two different types of plastics with different rigidity and/or hardness. The body portion 905 may be substantially flat and also without holes or apertures to prevent water or debris from passing through the service hole cover 902. The energy absorbers 904 may be disposed across or over the body portion. In some embodiments, the energy absorbers 904 span the width and/or length of the body portion 905 and in other embodiments, the energy absorbers 904 do not span the entire width and/or length of the body portion 905.

In some embodiments, the energy absorbers 904 are of uniform size and shape across the service hole cover 902. In other embodiments, there are multiple sizes and/or shapes of the energy absorbers 904 across the service hole cover 902.

FIG. 10 illustrates a side cross-sectional view of the cross-section A-A of the service hole cover 902 shown in FIG. 9. The energy absorbers 904 have grooves 1002 shown in the side cross-sectional view. The service hole cover 902 may cover the service hole in a manner that forms a seal over the service hole. The service hole cover 902 may serve to prevent water or debris from entering the interior chamber of the door exposed by the service hole. In order to form a seal between the service hole and the service hole cover 902, a sealing material (e.g., silicone) may be disposed in areas where the service hole cover 902 contacts the perimeter of the service hole, such as between a service hole cover flange 1004 and an interior door structure 1006 (e.g., internal door structure 111). The interior door structure 1006 may be any internal structure of the door that the service hole is formed in and may be made of sheet metal.

The seal formed with the sealing material may be temporary and may be removed using force on the service hole cover 902 or by heating or melting the sealing material. Alternatively, or in addition, the service hole cover 902 may be welded or brazed onto the service hole to form a permanent covering of the service hole.

Accordingly, the service hole cover 902 itself and the energy absorbers 904 may not have any openings or holes that allow water or debris to pass through.

FIG. 10 illustrates the energy absorbers 904 as being formed integrally into the service hole cover 902. However, in some embodiments, the energy absorbers 904 can be attached on top of a service hole cover 902. The energy absorbers 904 may be attached to the service hole cover 902 via any attachment method, such as welding, brazing, or attaching via an adhesive, for example. In these embodiments, there may be one or more holes in the service hole cover underneath each energy absorber to prevent buildup of pressure when the energy absorbers are compressed onto the service hole cover.

FIG. 11 illustrates an embodiment of a service hole cover 1102 having energy absorbers 1104 on both sides of the service hole cover 1102. There may be a first set of energy absorbers 1104A on a first side of the service hole cover 1102 and a second set of energy absorbers 1104B on a second side of the service hole cover 1102.

The energy absorbers 1104 may have a cavity height 1106, which may be half the height of other energy absorbers (e.g., height 724). The energy absorbers 1104A on the first side of the service hole cover 1102 may deform when an object exerts a force onto the energy absorbers 1104A (e.g., via compression, of the exterior door shell). The energy absorbers 1104B on the second side of the service hole cover 1102 may deform when the service hole cover 1102 is compressed against an object that is more radially inward from the centerline of the vehicle (e.g., the interior door trim).

The systems and devices described herein may be used in any conveyance, such as a vehicle with an internal combustion engine, a vehicle with a motor powered by a battery, a hybrid vehicle having both an engine and a motor, a fully autonomous vehicle, a semi-autonomous vehicle, or a human-driven vehicle, for example.

As used herein, approximately or substantially may be used with a plus or minus 10% margin. For example, a measurement that is approximately 5 feet may be between 4.5 feet and 5.5 feet.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A door service hole cover for covering a service hole of a door of a vehicle, the door service hole cover comprising:
   a substantially flat body portion configured to be attached to and seal the service hole of the door of the vehicle; and
   a plurality of energy absorbers disposed across the body portion and formed integrally with the body portion, each energy absorber having a top portion and one or more side walls surrounding the top portion and defining a cavity, the top portion and the one or more side walls of one or more energy absorbers of the plurality of energy absorbers meeting at a shoulder portion having a groove formed by thinning the shoulder portion and configured to control and promote the collapsing of one or more energy absorbers, each energy absorber having a closed end at the top portion and an open end opposite the closed end, each energy absorber configured to absorb energy and collapse when force is exerted by an object on the top portion, the object moving from the closed end toward the open end.

2. The door service hole cover of claim 1, wherein the groove is further configured to control and promote the collapsing of the one or more energy absorbers to a flattened state when the object fully compresses the one or more energy absorbers.

3. The door service hole cover of claim 2, wherein each energy absorber has a height in a normal state and a height in a flattened state, the height in the flattened state being approximately 5% of the height in the normal state.

4. The door service hole cover of claim 1, wherein the groove of the one or more energy absorbers spans an entire perimeter of the top portion of the one or more energy absorbers.

5. The door service hole cover of claim 1, wherein the groove of the one or more energy absorbers spans less than an entire perimeter of the top portion of the one or more energy absorbers.

6. The door service hole cover of claim 1, wherein the plurality of energy absorbers and the body portion do not have any holes or apertures, such that water or debris is prevented from passing through the body portion and the plurality of energy absorbers.

7. The door service hole cover of claim 1, wherein the body portion and the plurality of energy absorbers are made of a plastic material.

8. A vehicle door comprising:
 an interior door structure located within a door and having a service hole; and
 a service hole cover attached to the interior door structure, the service hole cover including:
  a substantially flat body portion configured to be attached to and seal the service hole; and
  a plurality of energy absorbers disposed across the body portion and formed integrally with the body portion, each energy absorber having a top portion and one or more side walls surrounding the top portion and defining a cavity, the top portion and the one or more side walls of one or more energy absorbers of the plurality of energy absorbers meeting at a shoulder portion having a groove formed by thinning the shoulder portion and configured to control and promote the collapsing of the one or more energy absorbers, each energy absorber having a closed end at the top portion and an open end opposite the closed end, each energy absorber configured to absorb energy and collapse when force is exerted by an object on the top portion, the object moving from the closed end toward the open end.

9. The vehicle door of claim 8, wherein the groove is further configured to control and promote the collapsing of the one or more energy absorbers to a flattened state when the object fully compresses the one or more energy absorbers.

10. The vehicle door of claim 9, wherein each energy absorber has a height in a normal state and a height in a flattened state, the height in the flattened state being approximately 5% of the height in the normal state.

11. The vehicle door of claim 8, wherein respective grooves of the one or more energy absorbers spans an entire perimeter of the top portion of the one or more energy absorbers.

12. The vehicle door of claim 8, wherein respective grooves of the one or more energy absorbers spans less than an entire perimeter of the top portion of the one or more energy absorbers.

13. The vehicle door of claim 8, wherein the plurality of energy absorbers and the body portion do not have any holes or apertures, such that water or debris is prevented from passing through the body portion and the plurality of energy absorbers.

14. The vehicle door of claim 8, wherein the body portion and the plurality of energy absorbers are made of a plastic material.

15. The vehicle door of claim 8, further comprising an adhesive disposed between the service hole cover and the internal door structure, the adhesive configured to seal a connection between the service hole cover and the internal door structure to prevent water or debris from passing through the connection between the service hole cover and the internal door structure.

16. A system for covering a service hole of a door of a vehicle, the system comprising:
 a substantially flat body portion configured to be attached to and seal the service hole; and
 a plurality of energy absorbers disposed across the body portion and formed integrally with the body portion, each energy absorber having a top portion and one or more side walls surrounding the top portion and defining a cavity, the top portion and the one or more side walls of one or more energy absorbers of the plurality of energy absorbers meeting at a shoulder portion having a groove formed by thinning the shoulder portion and configured to control and promote the collapsing of the one or more energy absorbers, each energy absorber having a closed end at the top portion and an open end opposite the closed end, each energy absorber configured to absorb energy and collapse when force is exerted by an object on the top portion, the object moving from the closed end toward the open end.

17. The system of claim 16, wherein the groove is further configured to control and promote the collapsing of the one or more energy absorbers to a flattened state when the object fully compresses the one or more energy absorbers.

18. The system of claim 17, wherein each energy absorber has a height in a normal state and a height in a flattened state, the height in the flattened state being approximately 5% of the height in the normal state.

19. The system of claim 16, wherein the plurality of energy absorbers and the body portion do not have any holes or apertures, such that water or debris is prevented from passing through the body portion and the plurality of energy absorbers.

20. The system of claim 16, wherein the body portion and the plurality of energy absorbers are made of a plastic material.

\* \* \* \* \*